United States Patent
Lequepeys et al.

(10) Patent No.: US 7,668,225 B2
(45) Date of Patent: *Feb. 23, 2010

(54) MULTI-MOK MODULATION/DEMODULATION TRANSMISSION PROCESS, CORRESPONDING TRANSMITTER AND RECEIVER

(75) Inventors: Jean-René Lequepeys, Fontaine (FR); Dominique Noguet, Grenoble (FR); Laurent Ouvry, Grenoble (FR); Didier Varreau, St. Georges de Commiers (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/468,906

(22) Filed: Aug. 31, 2006

(65) Prior Publication Data

US 2007/0110128 A1    May 17, 2007

Related U.S. Application Data

(63) Continuation of application No. 09/595,893, filed on Jun. 20, 2000, now Pat. No. 7,327,778.

(30) Foreign Application Priority Data

Jun. 29, 1999 (FR) .................................. 99 08308

(51) Int. Cl.
 *H04B 1/69* (2006.01)
(52) U.S. Cl. ........................ 375/141; 375/261; 375/279
(58) Field of Classification Search ................. 375/130, 375/267, 295, 261, 279, 298, 308, 141
See application file for complete search history.

(56) References Cited

U.S. PATENT DOCUMENTS

| 5,467,367 | A | 11/1995 | Izumi et al. |
| 5,692,007 | A | 11/1997 | Durrant et al. |
| 6,320,842 | B1 | 11/2001 | Mochizuki |
| 6,473,449 | B1 | 10/2002 | Cafarella et al. |
| 6,956,913 | B2 * | 10/2005 | Ouvry et al. ................. 375/343 |
| 7,327,778 | B1 * | 2/2008 | Lequepeys et al. .......... 375/141 |
| 2001/0040913 | A1 * | 11/2001 | Arai et al. .................... 375/144 |
| 2002/0118659 | A1 | 8/2002 | Sakoda et al. |
| 2002/0186651 | A1 | 12/2002 | Nee |

FOREIGN PATENT DOCUMENTS

| EP | 0 865 181 | 9/1998 |
| WO | WO96/05668 | 2/1996 |

OTHER PUBLICATIONS

Hyung Rae Park, A Parallel Code Acquisition technique for M-ary Orthogonal Signals in a Cellular CDMA System, IEEE vol. 49, Sep. 2000.*

* cited by examiner

*Primary Examiner*—Temesghen Ghebretinsae
(74) *Attorney, Agent, or Firm*—Connolly Bove Lodge & Hutz LLP

(57) ABSTRACT

At transmission, the data to be transmitted is divided into N data blocks, these N blocks are processed in parallel in N M-ary orthogonal keying (MOK) modulation channels, each modulation using a group of spread codes, each channel emitting a signal. All of these signals are transmitted in series. At reception, the signal received is processed in N M-ary orthogonal keying (MOK) demodulation channels, and the blocks obtained are grouped together in series.

19 Claims, 4 Drawing Sheets

MULTI-MOK MODULATION/DEMODULATION TRANSMISSION PROCESS, CORRESPONDING TRANSMITTER AND RECEIVER

CROSS REFERENCE TO RELATED APPLICATIONS

This is a continuation of U.S. patent application Ser. No. 09/595,893, filed Jun. 20, 2000 now U.S. Pat. No. 7,327,778.

FIELD OF THE INVENTION

The present invention relates to a multi-MOK modulation/demodulation transmission process, and the corresponding transmitter and receiver.

The invention is generally applied in digital applications and more particularly in wireless local area networks WLAN, wireless local loops WLL, mobile telephone communications, home automation and remote collection, communications in transportation, cabled television and multimedia services on cabled networks, etc.

STATE OF THE RELATED ART

The invention is based on the spectral spread technique. It is known that this technique consists of the modulation of a digital symbol to be transmitted by a pseudo-random sequence known by the user. Each sequence is composed of N items called "chips", the duration of which is one Nth of the duration of a symbol. This results in a signal with a spectrum spread over a range N times broader that that of the original signal. At reception, the demodulation consists of correlating the signal received with the sequence used at transmission to obtain the initial symbol.

This technique offers numerous advantages:
  discretion, since, as the power of the transmitted signal is constant and distributed over an N times broader band, its spectral power density is reduced by a factor N;
  immunity to voluntary or parasitic narrow band transmissions, the correlation operation carried out at the receiver resulting in the spectral spread of these transmissions;
  difficult interception (for usual signal to noise ratios), since the demodulation requires the knowledge of the sequence used at transmission;
  resistance to multiple paths which, under some conditions, induce selective frequency fading and, therefore, only affect the transmitted signal partially;
  possibility of a code division multiple access or CDMA: several direct sequence spectral spread links can share the same frequency band using orthogonal spread codes.

However, this technique has one disadvantage: its low spectral efficiency. This term refers to the data bit rate and the width of the band occupied. If each data symbol contains m bits, the data bit rate is equal to m times the symbol rate, or mDs. The occupied band is equal to double the chip frequency, i.e. 2N times the symbol rate, or 2NDs. Therefore, this gives a spectral density equal to the ratio $$\frac{mDs}{2NDs}, \text{ or } \frac{m}{2N}.$$

It would be possible to consider increasing the spectral efficiency by decreasing N, but this would affect the inherent qualities of the spread and, in particular, would have a detrimental effect on the immunity of transmissions. It would also be possible to consider increasing the symbol rate, but interference between symbols would be worsened.

Another solution would consist of increasing m, the number of data bits per symbol, which would result in the use of complex, "higher order" modulations. Indeed, the present invention uses this method. Therefore, it is possible to summarise what these modulations consist of, essentially two of said modulations, i.e. PSK or "Phase Shift Keying" modulation, which is a phase modulation (or encoding), and MOK or "M-ary Orthogonal Keying".

A description of these modulations can be found in two general works:
  Andrew J. VITERBI: "CDMA-Principles of Spread Spectrum Communication" Addison-Wesley Wireless Communications Series, 1975,
  John G. PROAKIS: "Digital Communication" McGraw-Hill International Editions, $3^{rd}$ edition, 1995.

Firstly, phase shift keying modulation is most frequently a binary modulation, referred to as BPSK, or quaternary modulation, referred to as QPSK. In the first case, symbols can be encoded to one bit m=1 and, in the second, to two bits m=2.

These modulations are generally used in their differential form DBPSK, DQPSK, which ensures satisfactory strength in difficult channels, when no phase retrieval loop is required. This differential form is also very well suited to processing the diversity of propagation paths.

At reception, a differential demodulator performs the multiplication between the signal to be demodulated and its version delayed by a symbol period. In the case of quaternary modulation, two signal channels are used, one channel which processes the component of the signal in phase with a carrier and another channel which processes the component in quadrature with the carrier.

Now, MOK modulation is a technique in which a signal taken from a set of orthogonal signals is associated with each symbol to be transmitted. These signals may be spread codes from the same group of orthogonal codes. In this case, the modulation also carries out the spread. However, these signals may also not be perfectly orthogonal since the orthogonal strain is lower than it seems. Naturally, however, performances are poorer in this case.

If a symbol is composed of m bits, there are $2^m$ possible configurations for the different symbols. Therefore, the number M of codes available must be at least equal to $2^m$. However, if the length of these codes is N, it is known that N orthogonal codes may be found. Therefore, M=N and the number of bits per symbol is limited to $\log_2 N$.

The MOK technique has a variant known as MBOK, M-ary Bi-Orthogonal Keying, consisting of adding, to the set of orthogonal signals used in an MOK modulation, their opposites to form a set of 2M signals, which are naturally no longer orthogonal with respect to each other. The demodulation also uses M correlators, adapted to each of the M orthogonal codes, but also requires sign retrieval means.

With the MOK technique, if, to increase the spectral efficiency, the number m of bits in each symbol was increased by one unit, the number M of codes required would be doubled, which would multiply the number of receiver channels by 2. Therefore, the complexity increases at a higher rate than the spectral efficiency. Therefore, this technique involves certain limitations.

MOK and MBOK modulations are used in certain digital communication systems, in conjunction with a coherent reception structure, which requires the knowledge of the phase of the carrier. Sending a preamble, before the transmission of the useful data, is a conventional process enabling the estimation of this phase. However, in channels subject to fading and/or multiple paths, the carrier phase is subject to variations which may be rapid and must be detected and compensated by the reception system. This is generally obtained by the periodic transmission of preambles which then occupy the channel and induce a decrease in the useful data bit rate. According to this scheme, the times of the preamble and the useful data packet must be less than the channel coherence time (time during which the channel is considered to be stationary). In addition, the complexity of the reception structure is increased.

For these reasons, those skilled in the art prefer to use non-coherent, or differentially coherent, demodulation schemes, which do not require the knowledge of the phase data. These techniques do away with the use of long preambles, phase estimators and phase derotators, in exchange for a slight loss of sensitivity. In addition, non-coherent demodulation simplifies the processing of the diversity of propagation paths very significantly since each path has, among other things, its own phase (and therefore would require its own phase estimator in a coherent scheme).

The present invention still aims to increase the spectral efficiency of links, while avoiding the disadvantages mentioned above and making use of the advantages of non-coherent demodulation.

DISCLOSURE OF THE INVENTION

To this end, the invention recommends to multiply the MOK modulation/demodulation operations to process a plurality of data blocks composed from the data to be transmitted. Naturally, this increases the number of codes, but, as will be seen more clearly below, this also increases the data bit rate very markedly. In the prior art, doubling, for example, the number of codes increased the number of bits transmitted by only one unit, while, in the invention, doubling the number of codes doubles the bit rate.

Therefore, more specifically, the invention relates to a data transmission process, characterised in that;

a) at transmission:
the data to be transmitted is divided into N data blocks,
these N blocks are processed in parallel in N M-ary orthogonal keying MOK modulation channels, each modulation using a group of spread codes, each channel emitting a signal,
all these signals are transmitted in series.

b) at reception:
the signal received is processed in N M-ary orthogonal keying MOK demodulation channels, giving N data blocks,
said N data blocks are grouped together in series to reproduce the transmitted data.

The MOK modulation and demodulation may consist of conventional type or M-ary bi-orthogonal keying MBOK type modulation and demodulation. They may also consist of an M-ary orthogonal keying modulation/demodulation combined with a phase shift keying PSK modulation/demodulation. The latter may be of the differential type, DPSK.

The number of spread codes may be the same in each group. It may also be different between groups. These numbers may advantageously be to the power of 2.

The present invention also relates to a transmitter for the implementation of the transmission phase of this process and a receiver for the implementation of the reception phase.

To underline the multiple nature of the process, and the link with the MOK techniques, the Applicant refers to its technique using the term multi-MOK, or M-MOK for short.

DESCRIPTION OF PARTICULAR EMBODIMENTS

Figure 1:
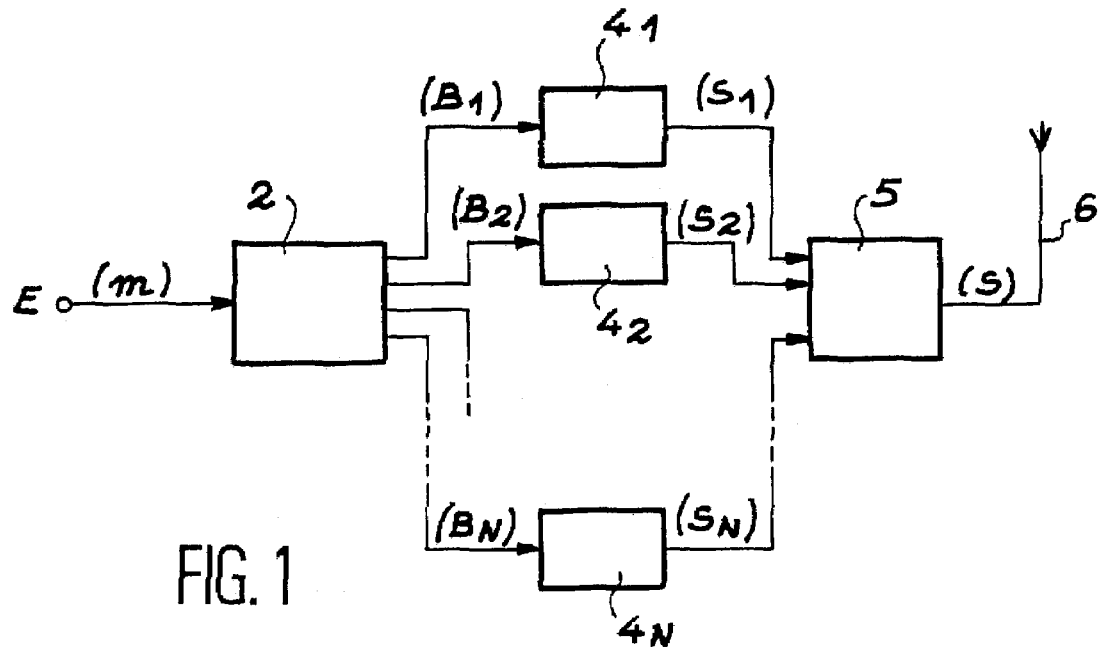
FIG. 1 is a block diagram of a transmitter according to the invention.

FIG. 1 is a schematic representation of a transmitter according to the invention. As shown, it comprises a main input E receiving the data to be transmitted (generally symbols comprising one or more bits). It is assumed that a packet of this data comprises m bits. This data is divided into N blocks $B_1, B_2, \ldots, B_N$ by a serial/parallel converter type circuit 2. These N blocks comprise $m_1, m_2, \ldots, m_N$ bits, respectively; these numbers may be equal, but not necessarily. The transmitter also comprises N MOK modulation means, $4_1, 4_2, \ldots, 4_N$. Each of these means comprises a group of spread codes sufficient in number to process the block it receives. As described in the description of the state of the related art, to process a block of $m_i$ bits, $2^{m_i}$ codes are required for a conventional MOK modulation. Since there are N groups of codes, the total number P of codes used in the transmitter is:

$$P = \sum_{i=1}^{N} 2^{m_i}$$

If all the blocks are composed of the same number of bits, or $m_u$, and if no code is used several times, the transmitter uses $P=N.2^{m_u}$ codes and it is capable of processing $N \times m_u$ bits.

Conversely, given the total number P of codes and the number N of groups, the number $m_u$ of bits per block is:

$m_u = \log_2(P/N)$ and the total number of bits transmitted is:

$$m = \sum_u m_u,$$

i.e. $N\log_2(P/N)$ if all the blocks have the same number of bits.

It is seen that to multiply the bit rate by N, it is sufficient to multiply the number of codes by N. If N=2, the bit rate is doubled by doubling the number of codes, while in the prior art doubling the number of codes only made it possible to add one bit. Therefore, the gain in terms of bit rate is considerable.

For the transmitter in FIG. 1, the means $4_1, 4_2, \ldots, 4_N$ emit signals $S_1, S_2, \ldots, S_N$ (which are spread codes selected according to the blocks to be transmitted). These signals are applied to a parallel-serial converter type circuit, the output of which is connected to transmission means 6.

Figure 2:
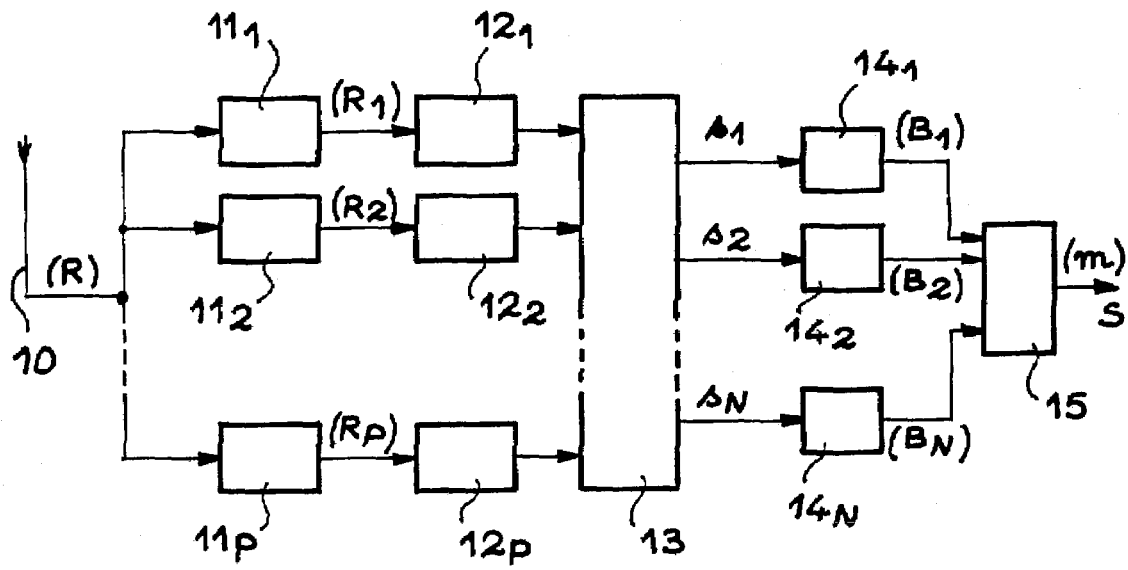
FIG. 2 is a block diagram of a receiver according to the invention.

FIG. 2 represents a corresponding receiver. As shown, this receiver comprises reception means 10, which emit a signal R, which is processed in a group of P filters $11_1, 11_2, \ldots, 11_P$ which may be considered to be distributed in N groups of filters, these filters being adapted to the spread code of the different groups used at transmission. Each of these filters receives the signal R and emits a filtered signal $R_1, R_2, \ldots, R_P$.

These filters are followed by the same number of means $12_1, 12_2, \ldots, 12_P$ to estimate the energy (or amplitude) of the filtered signals and a circuit 13 capable of determining, in each of the N groups of signals, which signal has the greatest energy (or amplitude). The circuit 13 has N outputs $s_1, s_2, \ldots, s_N$ each emitting the rank of the signal with the greatest energy. These outputs are connected to N code tables $14_1, 14_2, \ldots, 14_N$ which makes it possible to retrieve the N codes corresponding to these N ranks and emit the N corresponding data blocks $B_1, B_2, \ldots, B_N$. The receiver is completed by a parallel-serial converter type circuit 15, which reproduces, on a main output S, the transmitted data (in m bits).

The present invention may be used within the scope of a particular PSK and MOK technique referred to as DP-MOK. This technique was the subject of the French patent application No. 98 11564 submitted on 16 Sep. 1998 by the present Applicant, but which is not part of the related art to be taken into account for the consideration of the inventive activity of the present invention. In this DP-MOK technique, one part of the bits of each symbol is transmitted according to the MOK technique and another part according to the DPSK technique with spectral spread by the sequence selected for the MOK technique. At reception, the sequence used at transmission is first of all reproduced by adapted parallel filtering, thus reproducing a part of the bits of the symbol, The appropriate filter signal is demodulated differentially to retrieve the other part of the bits.

Figure 3:
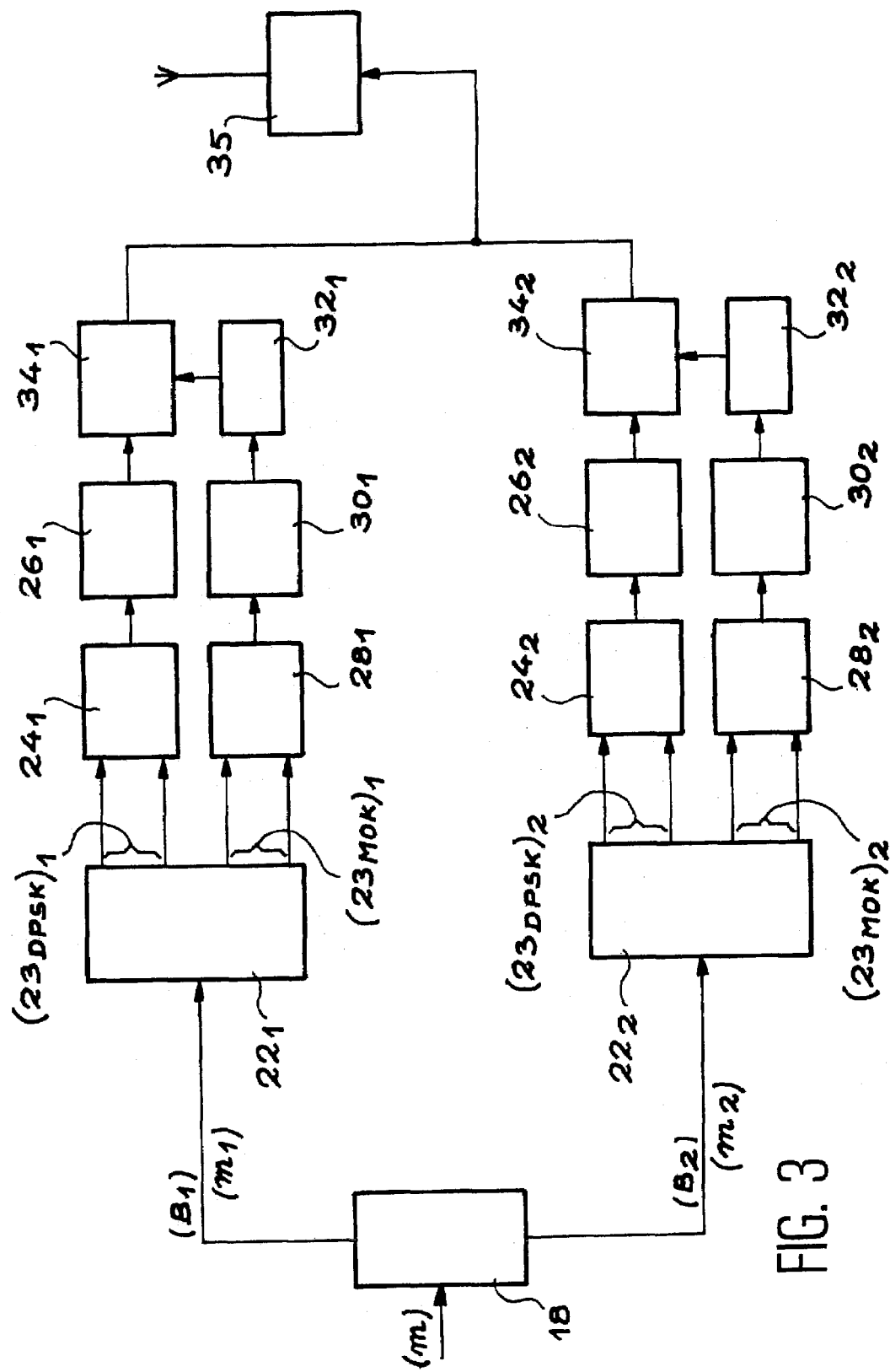
FIG. 3 is a diagram of a two-channel transmitter using the combined MOK-DPSK technique.

FIG. 3 shows an embodiment of a transmitter using this DP-MOK technique in the particular case where two channels are used (N=2). The two channels comprise the same means indicated by references indexed 1 for the first and 2 for the second. Only the first will be described, since the second can be immediately deduced from it.

The data to be transmitted (m bits) is converted to parallel by a serial-parallel converter 18 which emits two blocks $B_1$ and $B_2$ with the same number of bits $m_1$ and $m_2$. The first channel comprises:

means $22_1$ to divide the m bits of $B_1$ into a first subgroup $(23_{MOK})_1$ of $(m_{MOK})_1$ bits and a second subgroup $(23_{DPSK})_1$ of $(m_{DPSK})_1$ bits where $m_1=(m_{MOK})_1+(m_{DPSK})_1$;

a conversion circuit $28_1$ receiving the $(m_{MOK})_1$ bits and converting them to an address directed towards a code table $30_1$, which comprises 2 to the power of $(m_{MOK})_1$ orthogonal (or approximately orthogonal) spread codes and finally a generator $32_1$ of the selected spread code $(C_i)_1$;

a differential encoding circuit $24_1$, essentially composed of a logic multiplier and a time-delay circuit;

a PSK modulator referenced $26_1$;

a spectral spread circuit $34_1$ working with the code $(C_i)_1$ emitted by the generator $32_1$ and applying it to the modulated signal emitted by the modulator $26_1$.

The transmitter also comprises a radiofrequency stage 35 connected to the two channels and followed by a transmission antenna.

Figure 4:
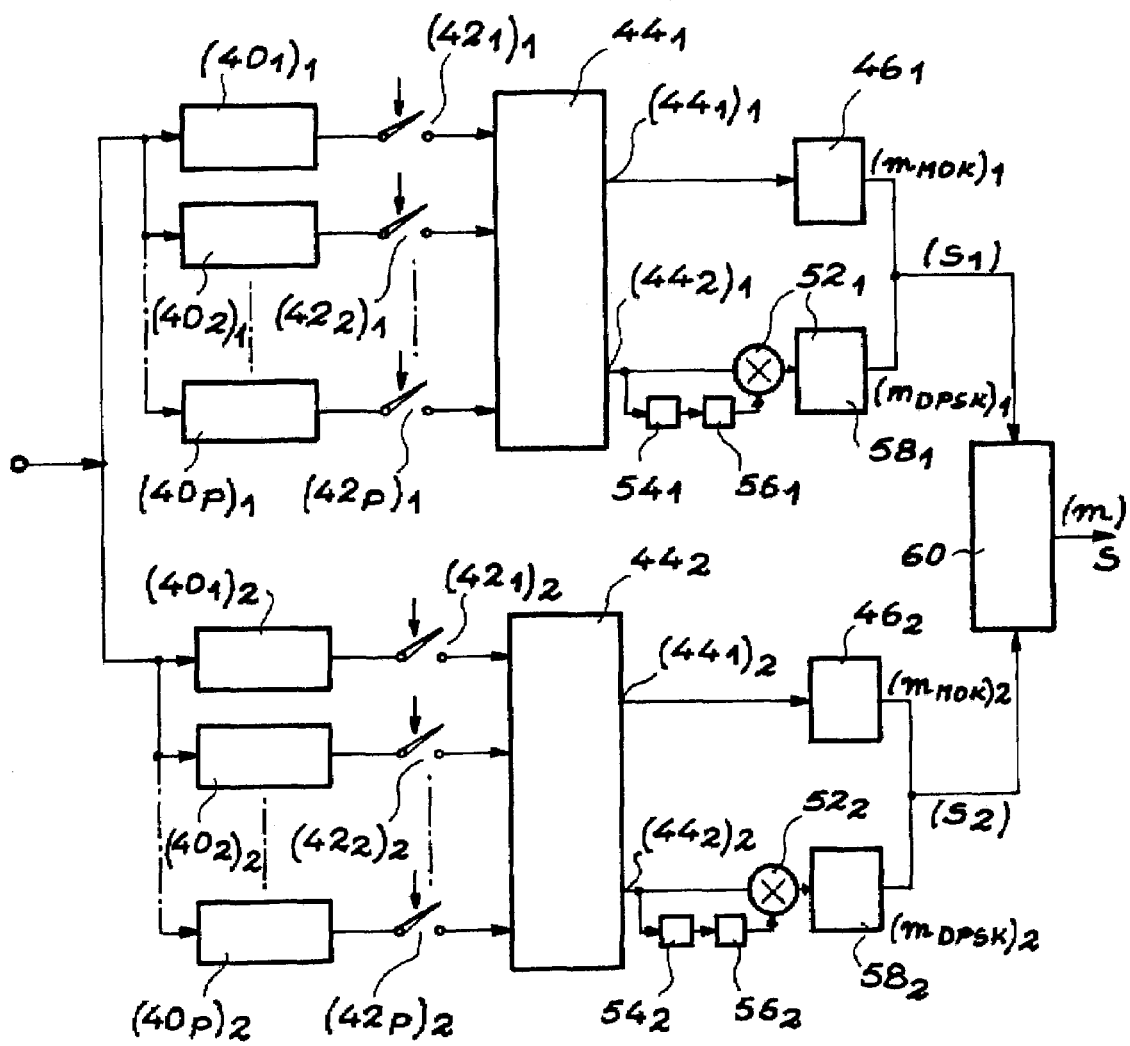
FIG. 4 is a diagram of a corresponding receiver.

The corresponding receiver is represented in FIG. 4. As shown, it comprises two identical channels, of which only the first will be described. This channel comprises:

P filters $(40_1)_1, (40_2)_1, \ldots, (40_P)_1$ adapted to the P spread codes that can be used at transmission, these filters receiving the signal in the basic band;

P samplers $(42_1)_1, (42_2)_1, \ldots, (42_P)_1$ controlled by a synchronisation signal;

means $44_1$ to determine the filtered signal which has the greatest energy (or amplitude) (maximum squared modulus), these means comprising a first output $(44_1)_1$ carrying the number of the channel corresponding to the maximum signal, and a second output $(44_2)_1$ emitting the actual signal;

a circuit $46_1$ connected to the first output and which, on the basis of the number of the channel corresponding to the signal with the greatest amplitude, emits the data $(m_{MOK})_1$;

a time-delayed multiplication circuit connected to the second output $(44_2)_1$ and composed of a multiplier $52_1$ of a circuit $54_1$ inverting the phase and a time-delay circuit $56_1$;

a PSK demodulator $58_1$ emitting the data $(m_{DPSK})_1$;

the data $(m_{MOK})_1$ and $(m_{DPSK})_1$ then being grouped together to reconstitute the transmitted symbol $S_1$.

The receiver is completed by a parallel-serial converter 60 which groups together the signals $S_1$ and $S_2$ and reproduces the m bits transmitted.

The maximum signal selection operation takes some time. As this operation is used to direct one of the inputs to the output (channel switching), it is essential to time-delay the channels by a corresponding time, since the switching must be carried out exactly on the data used for channel selection. Such time-delay operations are standard in such techniques and are not shown.

Figure 5:
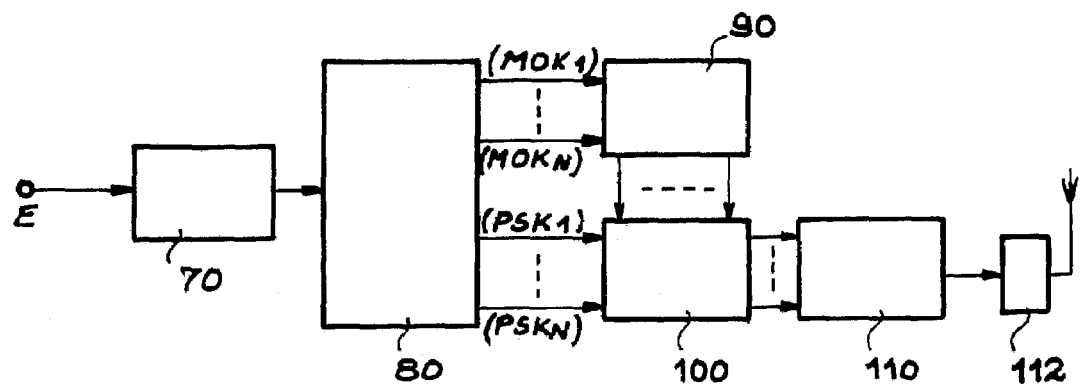
FIG. 5 is a general diagram of a transmitter with N MOK-PSK type channels.
Figure 6:
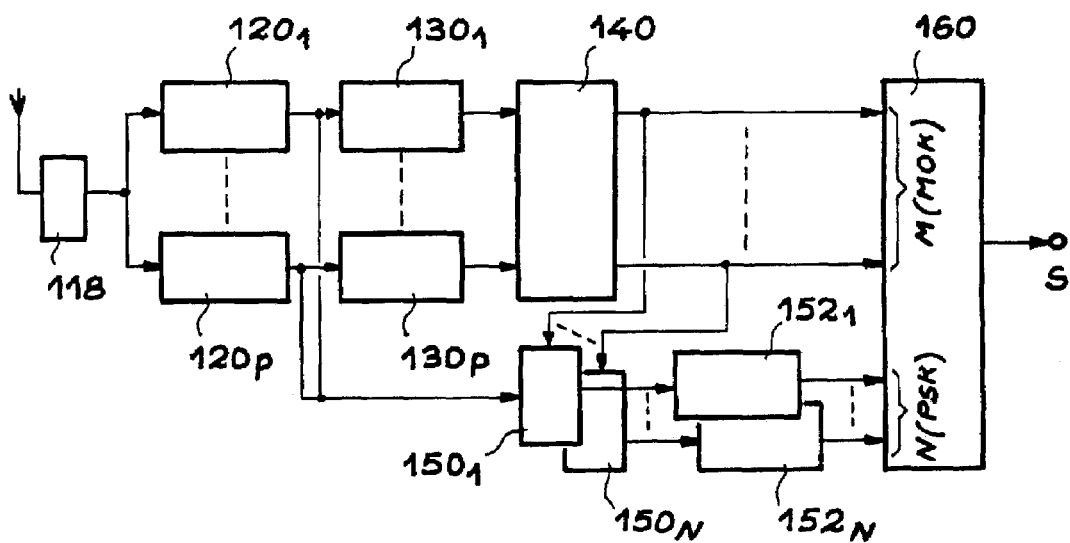
FIG. 6 is a general diagram of a corresponding receiver.

FIGS. 3 and 4 are analytical, to give a clearer understanding of this particular embodiment. However, in practice, the circuits may be more synthetic as shown in FIGS. 5 and 6. These Figures relate to a PSK technique.

FIG. 5 shows a transmitter with an input E, a serial/parallel converter 70, a circuit 8 dividing into N MOK blocks and N PSK blocks, a table 90 of P codes receiving on N inputs the N MOK blocks, a circuit 100 receiving the N codes selected in the table 90 and spreading the N PSK blocks, a circuit 110 combining the N spread signals $S_1, \ldots, S_N$, and finally transmission means 112.

FIG. 6 shows a receiver with reception means 118, a group of P adapted filters $120_1, \ldots, 120_P$, a group of P energy estimation circuits $130_1, \ldots, 130_P$ for the filtered signals, a circuit 140 receiving the P estimations and emitting on N outputs the N numbers of the channels carrying the N signals with the greatest energy, N circuits $150_1, \ldots, 150_N$ capable of selecting the channel corresponding to the number addressed to it, N PSK demodulators $152_1, \ldots, 152_N$, a formatting circuit 160 receiving on N first inputs N MOK blocks and on N second inputs N PSK blocks, this circuit emitting, on a main output S, the transmitted data.

Finally, it is possible to calculate the data bit rate obtained according to the invention for some particular cases.

In a first series of examples, it is assumed that all the codes are different. P is the total number of codes available. For the N codes used simultaneously to be different, at transmission, a code is selected from a group of P/N codes.

The number of MOK bits for each channel is:

$$(m_{MOK})_u = \log_2 P/N$$

$(m_{PSK})_u$ is the number of PSK bits on each channel. The number of bits transmitted per symbol is:

$$m = m_{MOK} + m_{PSK} = N\{\log_2 P/N + (m_{PSK})_u\}$$

Table 1 gives some numeric examples of MOK (N=1) (prior art) and M-MOK (N>1) (invention where $m_{PSK}$=2 (QPSK)) modulations.

|  | P = 8 | P = 16 |
|---|---|---|
| N = 1 (MOK) | $m_{MOK}$ = 3<br>m = 5 bits/symb | $m_{MOK}$ = 4<br>m = 6 bits/symb |
| N = 2 (M – MOK) | $m_{MOK}$ = 2<br>m = 8 bits/symb | $m_{MOK}$ = 3<br>m = 10 bits/symb |
| N = 4 (M – MOK) | $m_{MOK}$ = 1<br>m = 12 bits/symb | $m_{MOK}$ = 2<br>m = 16 bits/symb |
| N = 8 (M = MOK) | — | $m_{MOK}$ = 1<br>m = 24 bits/symb |

In the above examples, it was assumed that all the codes were different. However, it is possible to reuse the same code. A special code must then be associated with each code so that the codes transmitted on the channel are always different. Therefore, it is necessary to have P codes plus one special code. For simplification purposes, the value N=2 is taken.

The channels used are then selected from P and not from P/2. Consequently, the number of transmitted MOK bits is:

$$m_{MOK} = 2 \cdot \log_2 P \text{ instead of } 2 \cdot (\log_2)-1$$

When the detector detects a data item on the channel of the special code, it knows that the MOK data item is identical on the two channels used.

Numeric examples in the QPSK case:
P=8, N=2: m=2(3+2)=10 bits/symb
P=16, N=2: m=2(4+2)=12 bits/symb

The invention claimed is:

1. A data transmission process, comprising:
dividing data to be transmitted into N data blocks;
processing these N data blocks in parallel and forming N parallel M-ary orthogonal keying (MOK) modulation channels with N MOK modulation means for each of N parallel MOK modulation channels using a group of spread codes, each of the N parallel MOK modulation channels emitting a signal;
converting each of the N parallel MOK modulation channels with a parallel-to-serial converter to form a serial N MOK signal; and
transmitting the serial N MOK signal.

2. The process according to claim 1, wherein the modulation consist of M-ary bi-orthogonal keying (MBOK) modulation.

3. The process according to claim 1, wherein the modulation consist of M-ary orthogonal keying (MOK) modulation combined with phase shift keying (PSK) modulation and demodulation.

4. The process according to claim 3, wherein the phase shift keying modulation consist of differential phase shift keying (DPSK) modulation.

5. The process according to any of claims 1 to 4, wherein the number of spread codes is the same in each group.

6. The process according any of claims 1 to 4, wherein the spread codes used are all different from one group to another and the code numbers are equal to powers of 2.

7. The process according to any of claims 1 to 4, wherein certain spread codes are used in several groups.

8. A transmitter comprising:
means for dividing data to be transmitted into N data blocks;
means for processing these N data blocks in parallel and forming N parallel M-ary orthogonal keying (MOK) modulation channels with N MOK modulation means for each of N parallel MOK modulation channels using a group of spread codes, each of the N parallel MOK modulation channels to emit a signal;
means for converting each of the N parallel MOK modulation channels from parallel-to-serial to form a serial N MOK signal; and
means for transmitting the serial MOK signal.

9. The transmitter according to claim 8, wherein the modulation is an M-ary bi-orthogonal keying (MBOK) modulation.

10. The transmitter according to claim 8, wherein the modulation is an M-ary orthogonal keying (MOK) modulation combined with a phase shift keying (PSK) modulation.

11. The transmitter according to claim 10, wherein the phase shift keying modulation is a differential phase shift keying (DPSK) modulation.

12. A receiver comprising:
means for processing a received serial N MOK signal in parallel in N parallel M-ary orthogonal keying (MOK) demodulation channels, giving N data blocks, wherein the received serial N MOK signal comprises a signal including transmitted data that has been divided into N data blocks, which were MOK-modulated in parallel with MOK modulation means for each of N parallel MOK modulation channels and combined in series; and
means for grouping these N data blocks together in series to reproduce the transmitted data.

13. The receiver according to claim 12, wherein the demodulation is an M-ary bi-orthogonal keying (MBOK) demodulation.

14. The receiver according to claim 12, wherein the demodulation is an M-ary orthogonal keying (MOK) demodulation combined with a phase shift keying (PSK) demodulation.

15. The receiver according to claim 14, wherein the phase shift keying demodulation is a differential phase shift keying (DPSK) demodulation.

16. A data reception process comprising:
processing a received serial N MOK signal in parallel in N parallel M-ary orthogonal keying (MOK) demodulation channels, giving N data blocks, wherein the received serial N MOK signal comprises a signal including transmitted data that has been divided into N data blocks, which were MOK-modulated in parallel with MOK modulation means for each of N parallel MOK modulation channels and combined in series; and
grouping these N data blocks together in series to reproduce the transmitted data.

17. The process according to claim 16, wherein the demodulation is an M-ary bi-orthogonal keying (MBOK) demodulation.

18. The process according to claim 16, wherein the demodulation is an M-ary orthogonal keying (MOK) demodulation combined with a phase shift keying (PSK) demodulation.

19. The process according to claim 16, wherein the phase shift keying demodulation is a differential phase shift keying (DPSK) demodulation.

* * * * *